US005775672A

United States Patent [19]

Hsu

[11] Patent Number: 5,775,672

[45] Date of Patent: Jul. 7, 1998

[54] RELEASE VALVE FOR LIFTING DEVICES

[76] Inventor: Kun-Shan Hsu, No. 18-2, Hi Liau Pei Hou Lei, Chia Yi, Taiwan

[21] Appl. No.: 804,228

[22] Filed: Feb. 21, 1997

[51] Int. Cl.$^{6}$ .............................. F16K 31/50; F16K 51/00

[52] U.S. Cl. .......................... 251/215; 251/215; 251/337; 464/39

[58] Field of Search ............................ 137/315; 251/215, 251/216, 80, 81, 336; 464/37, 38, 39

[56] References Cited

U.S. PATENT DOCUMENTS

| | | | |
|---|---|---|---|
| 65,160 | 5/1867 | Brinckmann | 251/336 |
| 562,628 | 6/1896 | Lester | 251/336 |
| 1,065,521 | 6/1913 | Gorman | 251/336 |
| 1,548,512 | 8/1925 | Costello | 251/215 |
| 2,256,496 | 9/1941 | Robinson | 464/37 |
| 2,831,648 | 4/1958 | Meyer et al. | 251/81 |
| 4,072,167 | 2/1978 | Habiger | 251/337 |
| 4,519,580 | 5/1985 | Leighton et al. | 137/315 |
| 4,643,390 | 2/1987 | Karr, Jr. et al. | 251/337 |
| 4,779,840 | 10/1988 | Andrea | 251/337 |
| 4,867,415 | 9/1989 | Andrea | 251/337 |
| 5,065,787 | 11/1991 | Lochmann | 137/315 |

*Primary Examiner*—George L. Walton
*Attorney, Agent, or Firm*—Morton J. Rosenberg; David I. Klein; Jun Y. Lee

[57] ABSTRACT

A release valve for a lifting device includes a valve stem, a fixing seat, a spiral spring, and a knob. The valve stem includes a first conical end mounted in an oil path of the lifting device, a mediate portion, and a second end beyond the lifting device. The valve stem further includes a threaded section in threading engagement with the lifting device. The fixing seat is mounted around the mediate portion of the valve stem and is beyond the lifting device. The fixing seat includes a boss formed on a first side thereof, a central through hole extending through the fixing seat and the boss. The boss includes a longitudinal slit defined in a periphery thereof. The spiral spring is mounted around the boss of the fixing seat. The spiral spring has an inner end which is securely received in the longitudinal slit of the boss and an outer end. The knob is securely mounted around the second end of the valve stem to rotate therewith. The knob includes a protrusion projecting from a side thereof, and the outer end of the spiral spring is securely engaged with the protrusion.

4 Claims, 6 Drawing Sheets

RELEASE VALVE FOR LIFTING DEVICES

BACKGROUND OF THE INVENTION

1. Field of the Invention

The present invention relates to a release valve for lifting devices.

2. Description of the Related Art

Traditionally, a lifting device, e.g., a jack, a hoist, etc, generally includes a cylinder having an inner telescopic rod mounted therein. Upon manual repetitious operation on an arm, the hydraulic oil in an oil reservoir flows into the cylinder to urge the inner telescopic rod to move upwardly for lifting an object. Upon actuation of a release valve, the telescopic rod moves downwardly as the hydraulic oil in the cylinder flows into the oil reservoir. Nevertheless, in such conventional lifting device, the inner telescopic rod directly, immediately moves back to its initial lower position when the release valve is actuated, which may cause injury to people below the object.

FIG. 5 of the drawing illustrates a hydraulic jack 4 which includes a cylinder 41, a lifting base 42, and a release valve 5. The release valve 5 includes a valve stem 54, a torsion spring 51 mounted around a part of the valve stem 54, a sleeve 53 mounted around the torsion spring 51, and a knob 52 attached to an exposed end of the valve stem 54, wherein the torsion spring 51 has a first end securely attached to a side wall of the jack and a second end securely inserted into the knob 52. After manually rotating the knob 52 in a direction and the lifting base 42 has been lowered for a height, once the knob 52 is released, the torsion spring 51 urges the knob 52 to move back to its closed position such that a ball 56 in front of the valve stem 54 reblocks the oil path to interrupt the lowering of the lifting base 42, thereby preventing immediate, direct lowering of the lifting base 42. FIG. 6 of the drawings illustrates a hoist device 6 which uses the jack 4 in FIG. 5, wherein the hoist device 6 includes a horizontal beam 61 attached to the lifting base 42 of the jack 4, while a hook 62 is mounted to a front end of the horizontal beam 61 for lifting a heavy object. Potential injury to people below the heavy object due to direct lowering of the lifting base 42 may be avoided via the use of the release valve 5.

Nevertheless, respective positioning of the two ends of the torsion spring 51 to the side wall of the jack 4 and the knob 52 must be very accurate, otherwise, assembly of the release valve 5 becomes very troublesome and difficult. In addition, the pitch 510 of the spring 51 is limited. More specifically, if the pitch is too large, the whole release valve 5 shall occupy a considerable space and the exposed length of the release valve 5 might be too long and thus be damaged by a moving heavy object. If the pitch is too small, the displacement of the valve stem 54 might be too small and thus neither be able to effectively push a ball 56 in front of the valve stem 54 nor be able to control the lowering speed of the lifting base 42.

The present invention is intended to provide an improved release valve which mitigates and/or obviates the above problems.

SUMMARY OF THE INVENTION

In accordance with the present invention, a release valve for a lifting device having a cylinder comprises a valve stem, a fixing seat, a spiral spring, and a knob. The valve stem includes a first conical end mounted in an oil path of the lifting device, a mediate portion, and a second end beyond the lifting device. The valve stem further includes a threaded section in threading engagement with the lifting device.

The fixing seat is mounted around the mediate portion of the valve stem and is beyond the lifting device. The fixing seat includes a boss formed on a first side thereof, a central through hole extending through the fixing seat and the boss. The boss includes a longitudinal slit defined in a periphery thereof. The spiral spring is mounted around the boss of the fixing seat. The spiral spring has an inner end which is securely received in the longitudinal slit of the boss and an outer end.

The knob is securely mounted around the second end of the valve stem to rotate therewith. The knob includes a protrusion projecting from a side thereof, and the outer end of the spiral spring is securely engaged with the protrusion. In addition, a sealing means is used to provide a sealing between the release valve and the lifting device.

In an embodiment of the present invention, the knob includes a central through hole and a radial hole in communication with the central through hole, and a pin extends through the radial hole with an end thereof securely received in the central through hole of the valve stem.

The sealing means may include an annular groove defined in a second side of the fixing seat which is opposite to the first side of the fixing seat, and a sealing ring may be mounted in the annular groove. The sealing means may further include a pair of flanges formed on the mediate portion of the valve stem. The flanges are received in the through hole of the fixing seat and include an annular recess defined therebetween, and a sealing ring is received in the annular recess.

Other objects, advantages, and novel features of the invention will become more apparent from the following detailed description when taken in conjunction with the accompanying drawings.

BRIEF DESCRIPTION OF THE DESCRIPTION

DESCRIPTION OF THE PREFERRED EMBODIMENT

Figure 1:
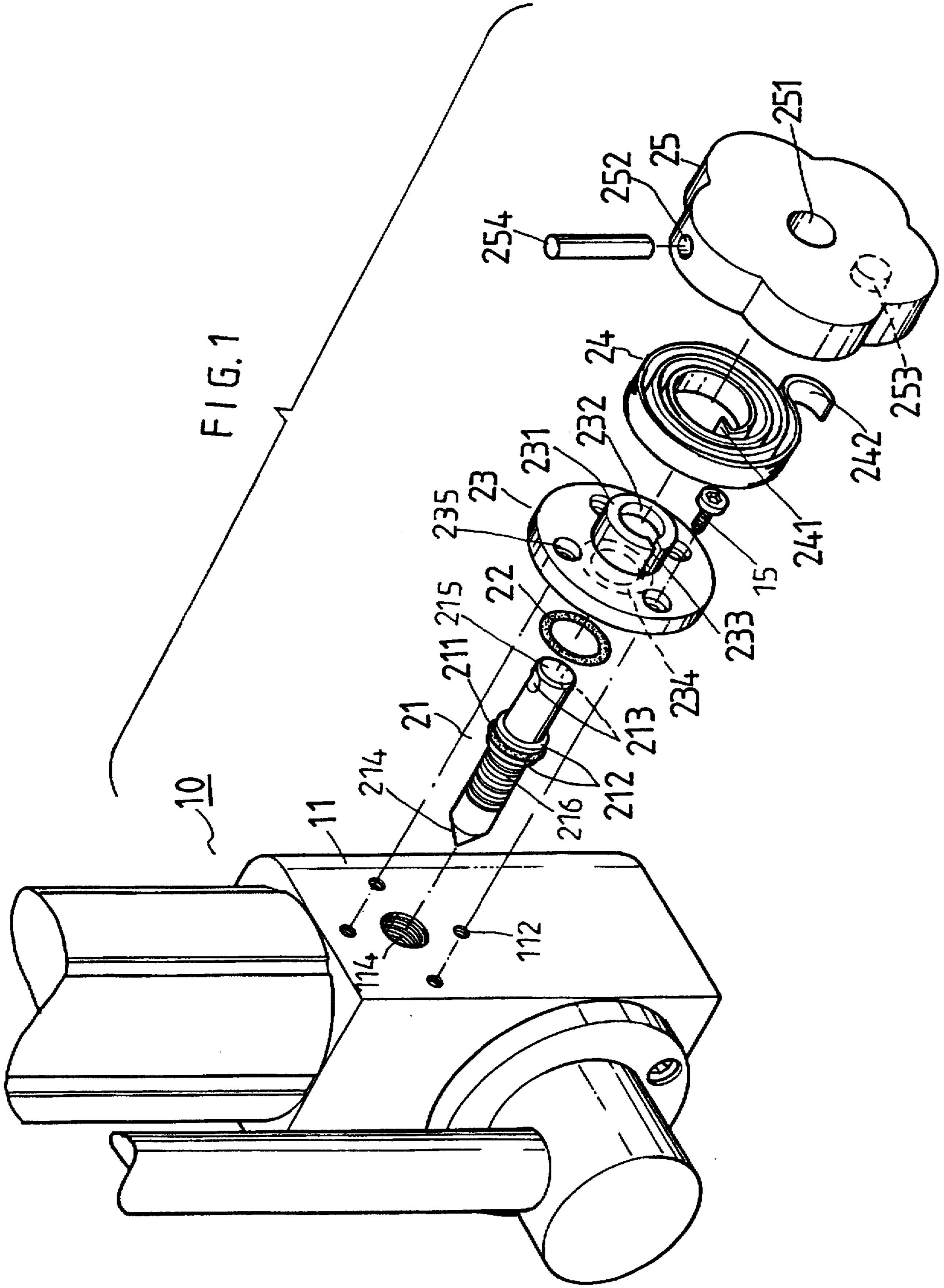
FIG. 1 is an exploded perspective view of a release valve for a lifting device in accordance with the present invention.
Figure 2:
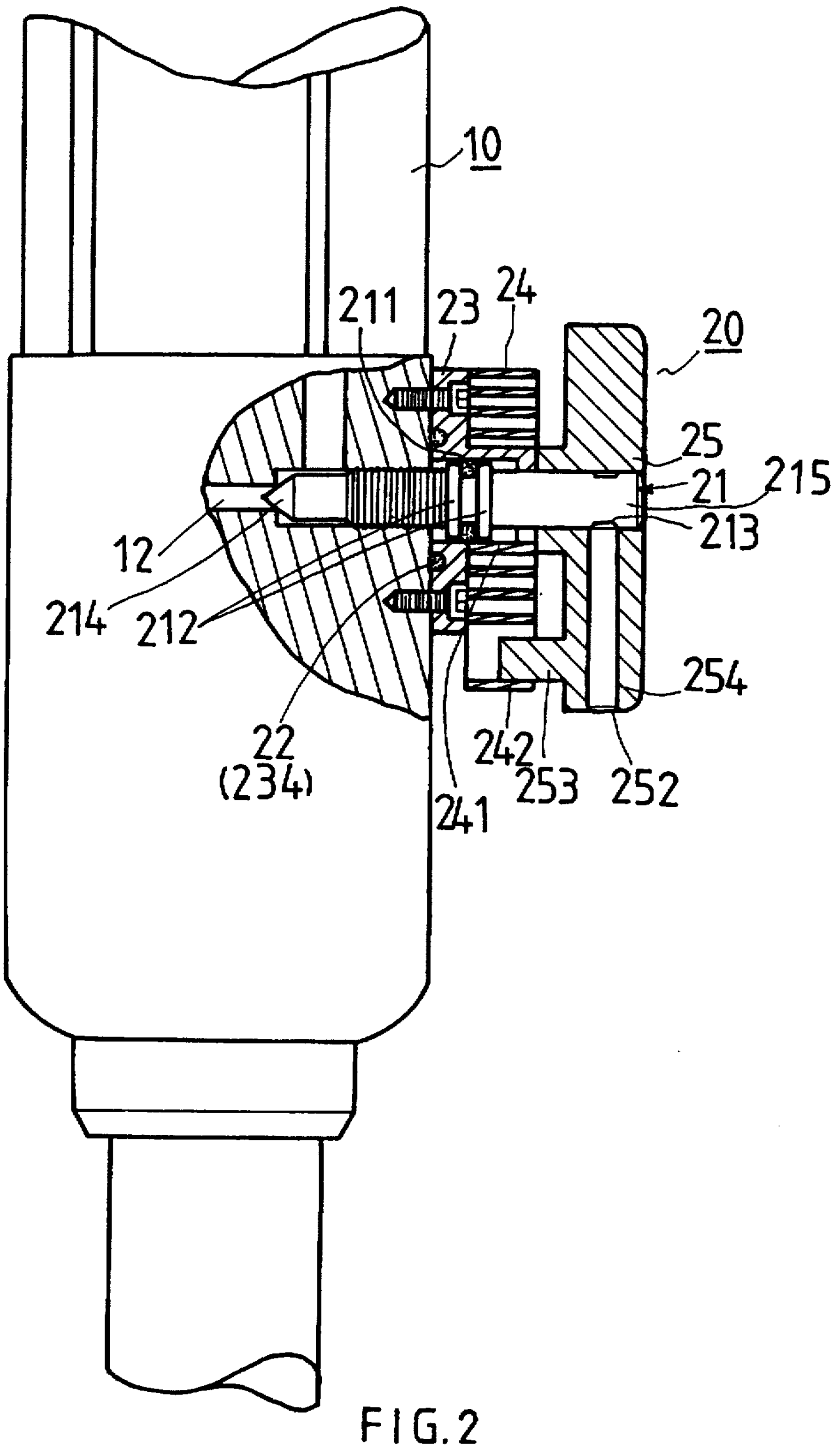
FIG. 2 is a partially sectioned elevational view illustrating a part of the lifting device having the release valve in accordance with the present invention.
Figure 3:
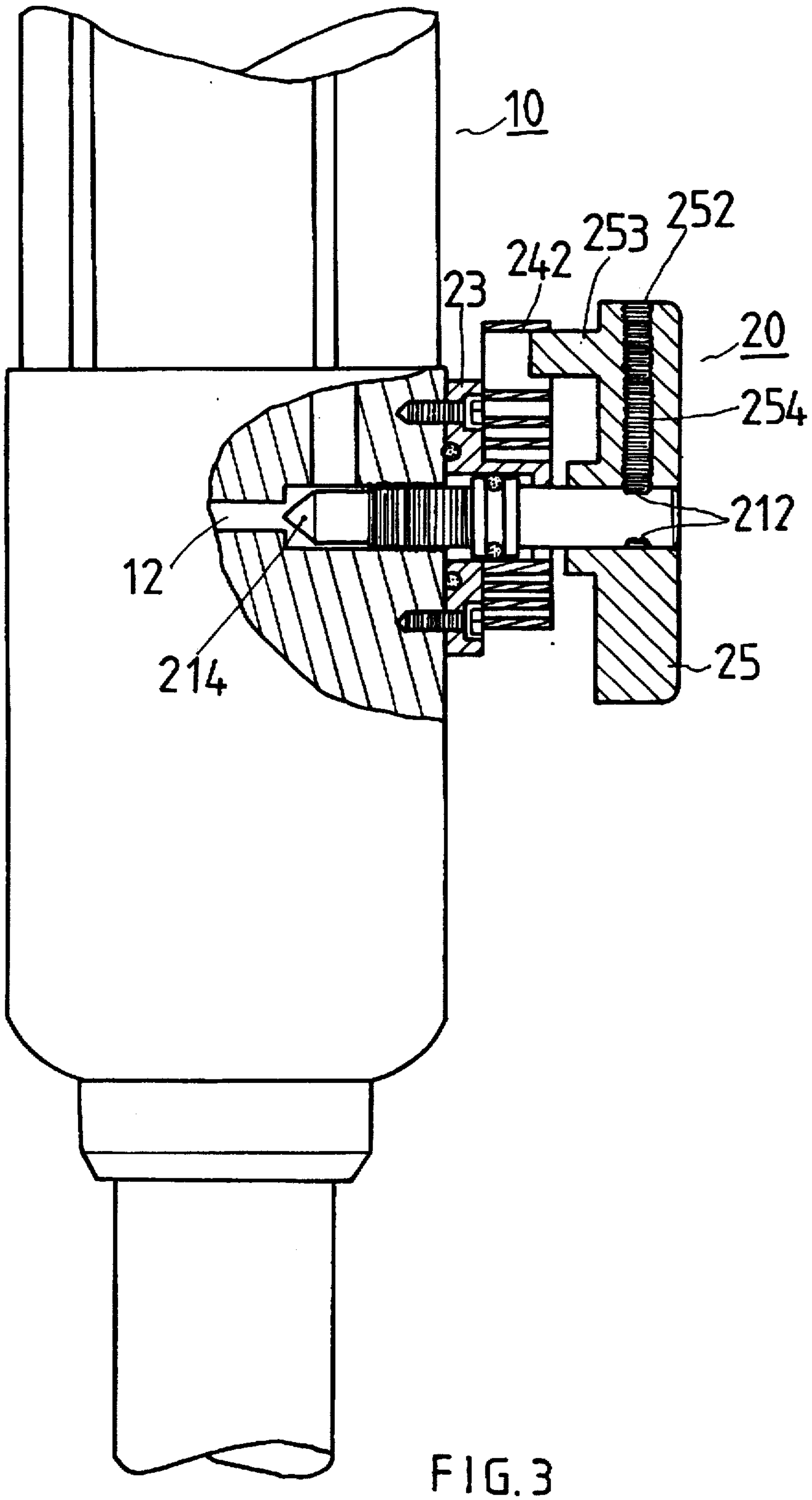
FIG. 3 is a partially sectioned elevational view similar to FIG. 2, illustration a release operation of the lifting device.

Referring to FIGS. 1 to 4 of the drawings and initially to FIGS. 1 and 2, a release valve for a lifting device, e.g., a hydraulic jack 10 in accordance with the present invention generally is designated by reference numeral "20" and includes a valve stem 21, a sealing ring 22, a fixing seat 23, a spiral spring 24, and a knob 25. The valve stem 21 includes a first conical end 214, a second end 215 having a transverse through hole 213 defined therein, and a pair of flanges 212 formed on a mediate portion thereof. As clearly shown in FIG. 2, a sealing ring 211 is received in an annular recess (not labeled) defined between the flanges 212.

The fixing seat 23 includes a boss 231 formed on a first side thereof, and a central through hole 232 extends through the fixing seat 23 and the boss 231. The boss 231 includes a longitudinal slit 233 defined in a periphery thereof. An annular groove 234 is defined in a second side of the fixing seat 23. The sealing ring 22 is mounted in the annular groove 234, as shown in FIG. 2. The spiral spring 24 includes an inner end 241 which is securely received in the longitudinal slit 233 of the boss 231 and an outer end 242 which engages with a protrusion 253 projecting from a side of the knob 25. The knob 25 includes a central through hole 251 and a radial hole 252 in communication with the central through hole 251. A pin 254 extends through the radial hole 252 with an end thereof securely received in the hole 213 of the valve stem 21, as shown in FIG. 2.

In assembly, still referring to FIGS. 1 and 2, the sealing ring 22 is inserted into the annular groove 234 of the fixing seat 23, and the valve stem 21 is extended through the hole 232 in which the sealing ring 211 is fitted to provide the required sealing effect. The first end 214 of the valve stem 21 is received inside the jack 10 at a position to initially block an oil path. Then, the fixing seat 23 is secured to an outer wall of a cylinder 11 of the jack 10 by means of, e.g., screws 15 extending through a respective plurality of holes 235 in the fixing seat 23 and screw holes 112 in the outer wall of the cylinder 11. Thereafter, the spiral spring 24 is mounted around the boss 231 in which the inner end 241 is securely retained in the slit 233. The knob 25 is then mounted around the second end 215 of the valve stem 21 in which the outer end 242 of the spiral spring 24 securely engages with the protrusion 253 of the knob 25. The pin 254 is extended through the hole 252 with the inner end thereof securely retained in the hole 213 of the valve stem 21.

Figure 4:
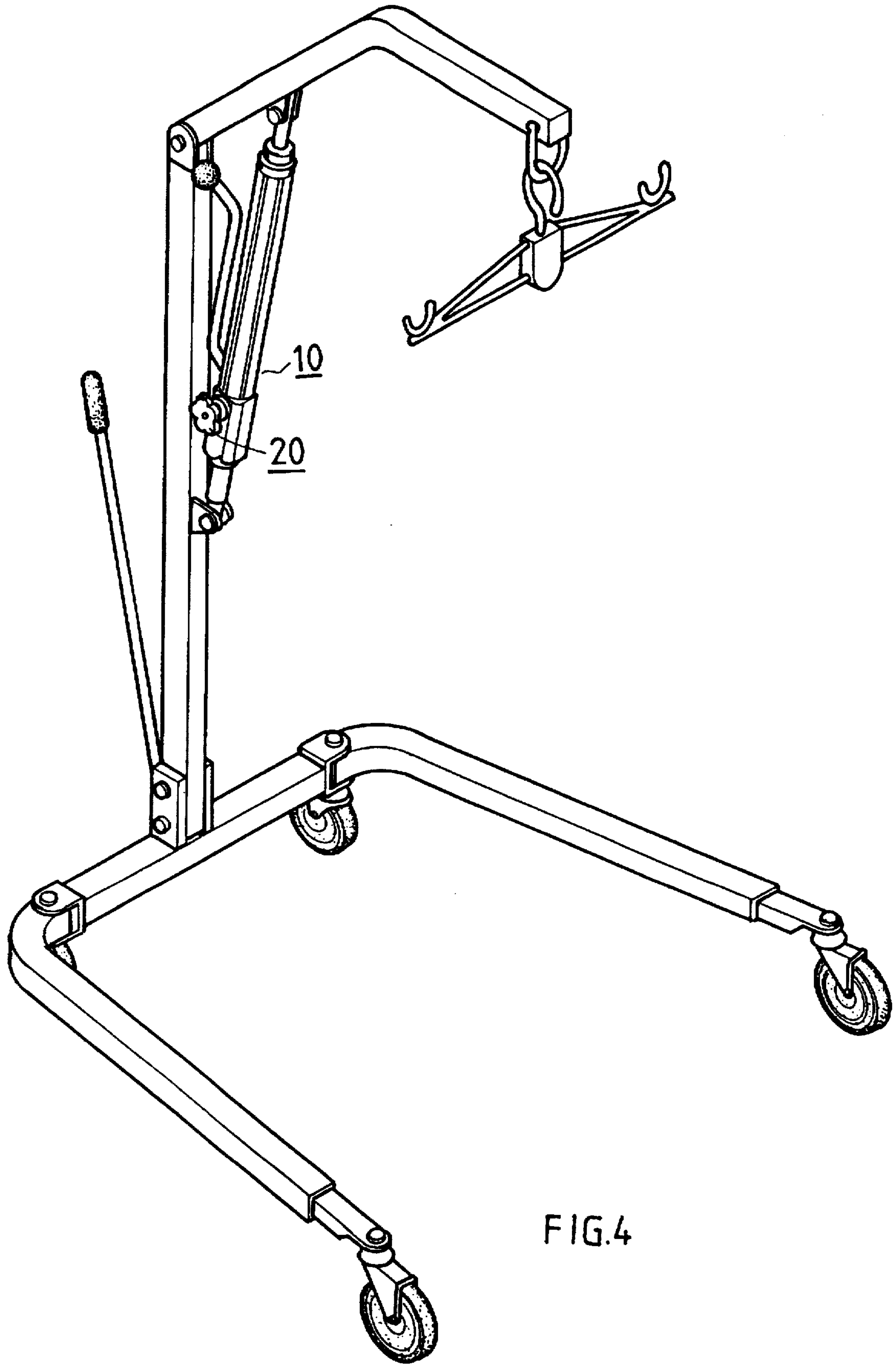
FIG. 4 is a perspective view of a hoist device which uses the release valve in accordance with the present invention.
Figure 5:
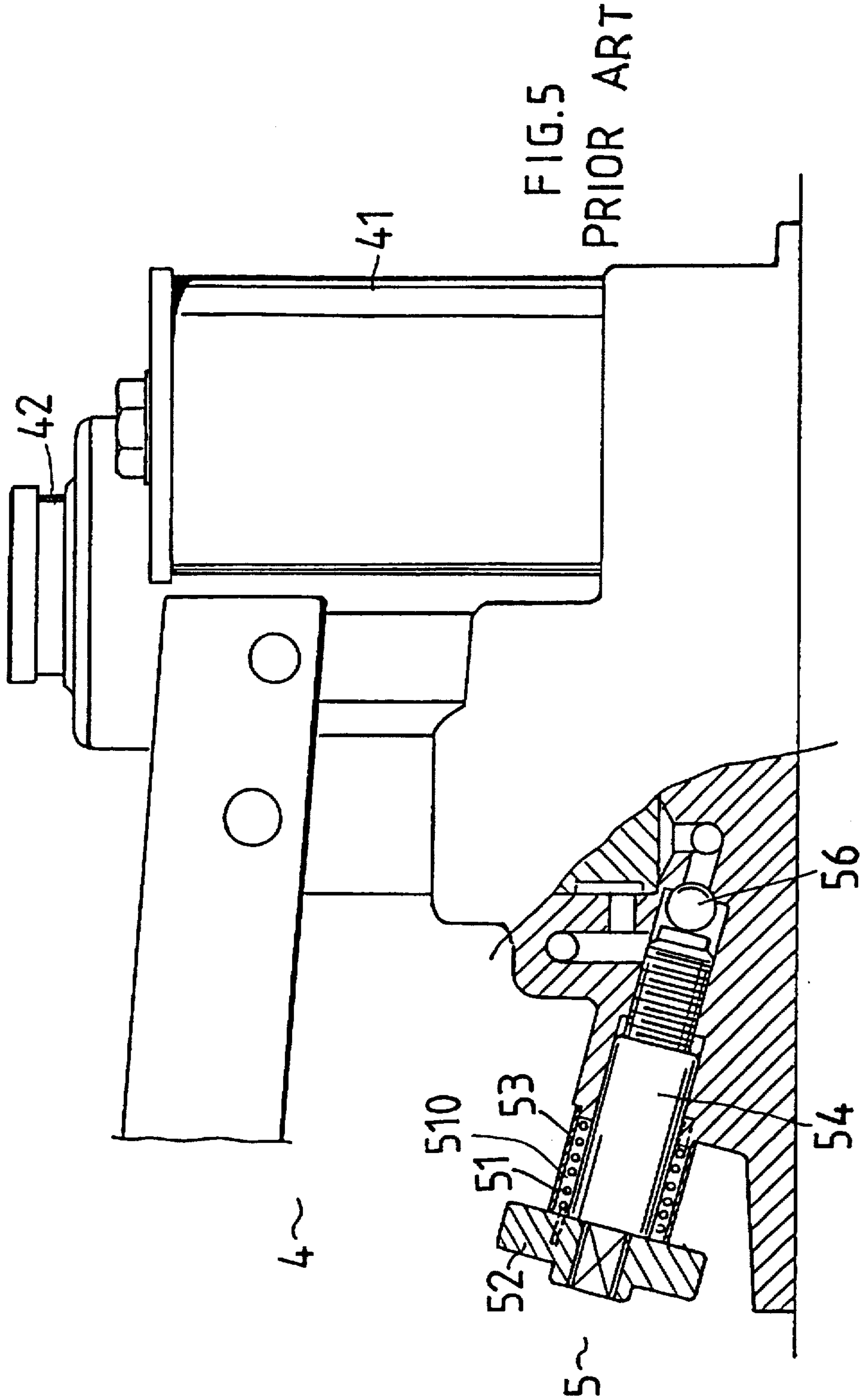
FIG.5 PRIOR ART
FIG. 5 is a schematic side elevational view, partially sectioned, of a conventional jack.
Figure 6:
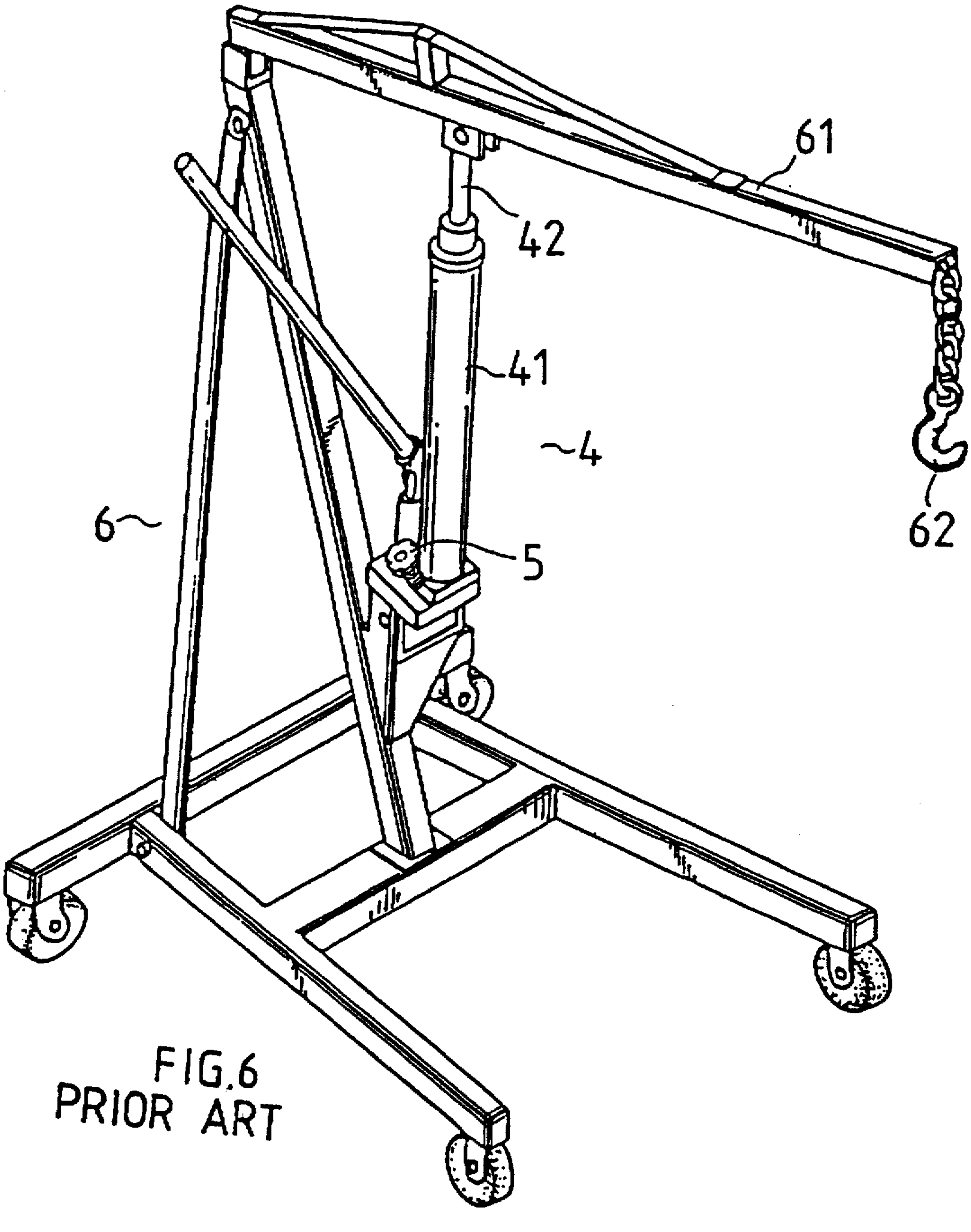
FIG.6 PRIOR ART
FIG. 6 is a perspective view of a hoist device which uses the jack in FIG. 5.

The oil path in FIG. 2 is in a closed status. When pressure release is required for lowering a lifting base (not shown) of the jack 10, the knob 25 is rotated in a first direction, e.g., clockwise, such that the valve stem 21 moves outwardly away from the cylinder 11 to a position shown in FIG. 3 (due to threading engagement of a male threading 216 on the valve stem 21 and a female threading 114 in the outer wall of the cylinder 11, see FIG. 1). Hydraulic oil in the cylinder 11 flows back to a reservoir (not shown) via an oil path 12 and thus, the lifting base is lowered. Operation of the hydraulic jack is conventional and therefore not further described. When the knob 25 is released, the spiral spring 24 urges the valve stem 21 to rotate and thus move toward the cylinder 11 and thus the valve stem 21 reblocks the oil path 12, thereby preventing further lowering of the lifting base. FIG. 4 illustrates application of the jack 10 to a hoist device which is conventional and therefore not further described.

By such an arrangement, the travel of lowering the lifting base can be controlled to prevent direct, immediate lowering of a lifted heavy object. Thus, potential injury to people below the object is avoided.

According to the above description, it is appreciated that the release valve of the present invention has the following advantages when compared to the conventional design:

(1) the release valve of the present invention can be easily and quickly assembled;

(2) the release valve of the present invention is compact and small enough to avoid impact from the object to be lifted; and (3) the lifted heavy object can be lowered by a small distance or a relatively longer distance due to demand.

Although the invention has been explained in relation to its preferred embodiment, it is to be understood that many other possible modifications and variations can be made without departing from the spirit and scope of the invention as hereinafter claimed.

What is claimed is:

1. A release valve for a lifting device having a cylinder with an oil path, the release valve comprising:

a valve stem having a first conical end adapted to be displaceably mounted in the oil path of the lifting device to selectively block and unblock the oil path, a mediate portion, and a second end extending from the lifting device, the valve stem further including a threaded section in threading engagement with the lifting device;

a fixing seat mounted to the lifting device and including a boss formed on a first side thereof and a central through hole extending through the fixing seat and the boss, the second end of the valve stem passing through the central through hole and the mediate portion of the valve stem being disposed within the fixing seat, the boss including a longitudinal slit defined in a periphery thereof;

a spiral spring mounted around the boss of the fixing seat, the spiral spring having an inner end which is securely received in the longitudinal slit of the boss and an outer end;

a knob securely mounted to the second end of the valve stem to rotate therewith, the knob including a protrusion projecting from a side thereof, the outer end of the spiral spring being securely engaged the protrusion for applying a bias force thereto; and sealing means disposed between the fixing seat and the lifting device for providing a seal therebetween, whereby a user's rotational displacement of the knob in a direction displaces the first conical end of the valve stem to unblock the oil path and wind the spiral spring, the spiral spring rotatively displaces the knob in an opposite direction to displace the first conical end of the valve stem to re-block the oil path responsive to the user's release of the knob.

2. The release valve according to claim 1, wherein the knob includes a central through hole and a radial hole in communication with the central through hole, and a pin extends through the radial hole with an end thereof securely received in a central through hole of the valve stem.

3. The release valve according to claim 1, wherein:

the sealing means includes an annular groove defined in a second side of the fixing seat which is opposite to the first side of the fixing seat, and a sealing ring is mounted in the annular groove.

4. The release valve according to claim 1, wherein:

the sealing means includes a pair of flanges formed on the mediate portion of the valve stem, the flanges are received in the through hole of the fixing seat and include an annular recess defined therebetween, and a sealing ring is received in the annular recess.

* * * * *